(12) United States Patent
Obaditch et al.

(10) Patent No.: US 8,544,714 B1
(45) Date of Patent: Oct. 1, 2013

(54) CERTIFICATION OF A WELD PRODUCED BY FRICTION STIR WELDING

(71) Applicant: Fluor Technologies Corporation, Aliso Viejo, CA (US)

(72) Inventors: Chris Obaditch, Corona Del Mar, CA (US); Glenn J. Grant, Benton City, WA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 0 days.

(21) Appl. No.: 13/677,586

(22) Filed: Nov. 15, 2012

(51) Int. Cl.
*B23K 20/12* (2006.01)

(52) U.S. Cl.
USPC ................ 228/102; 228/2.1; 228/9; 228/103; 228/104; 228/112.1

(58) Field of Classification Search
None
See application file for complete search history.

(56) References Cited

U.S. PATENT DOCUMENTS

| | | | |
|---|---|---|---|
| 5,686,002 A * | 11/1997 | Flood et al. | 219/137 R |
| 5,893,507 A | 4/1999 | Ding | |
| 6,050,475 A | 4/2000 | Kinton | |
| 6,095,395 A * | 8/2000 | Fix, Jr. | 228/2.3 |
| 6,168,066 B1 | 1/2001 | Arbegast | |
| 6,299,050 B1 | 10/2001 | Okamura | |
| 6,857,553 B1 * | 2/2005 | Hartman et al. | 228/103 |
| 7,734,450 B2 * | 6/2010 | Murakawa et al. | 703/2 |
| 7,848,837 B2 * | 12/2010 | Badarinarayan et al. | 700/110 |
| 8,222,896 B2 | 7/2012 | Dasch | |
| 2003/0052107 A1 * | 3/2003 | Suzuki | 219/130.01 |
| 2003/0057258 A1 | 3/2003 | Ishida | |
| 2003/0205565 A1 * | 11/2003 | Nelson et al. | 219/148 |
| 2004/0239317 A1 | 12/2004 | Goldfine | |
| 2005/0017713 A1 * | 1/2005 | Goldfine et al. | 324/240 |
| 2005/0035173 A1 * | 2/2005 | Steel et al. | 228/2.1 |
| 2008/0083817 A1 * | 4/2008 | Baumann et al. | 228/102 |
| 2008/0206586 A1 * | 8/2008 | Imanaga et al. | 428/598 |
| 2009/0140026 A1 | 6/2009 | Okauchi | |
| 2009/0226343 A1 * | 9/2009 | Telioui et al. | 420/535 |
| 2010/0001133 A1 * | 1/2010 | Kempa et al. | 244/118.6 |
| 2010/0117636 A1 | 5/2010 | Dasch | |
| 2010/0163601 A1 | 7/2010 | Grooms et al. | |
| 2010/0288400 A1 * | 11/2010 | Bordesoules et al. | 148/535 |
| 2010/0326962 A1 * | 12/2010 | Calla et al. | 219/76.14 |
| 2011/0100525 A1 * | 5/2011 | Okauchi et al. | 156/64 |

(Continued)

FOREIGN PATENT DOCUMENTS

DE 102004030381 A * 1/2006
DE 102008046692 A * 3/2011

(Continued)

OTHER PUBLICATIONS

Paul Fleming, Monitoring and Control in Friction Stir Welding, Dissertation submitted to the Faculty of Graduate School of Vanderbilt University, May 2009.

(Continued)

*Primary Examiner* — Kiley Stoner
(74) *Attorney, Agent, or Firm* — Fish & Associates, PC

(57) ABSTRACT

Methods, devices, and systems for providing certification of friction stir welds are disclosed. A sensor is used to collect information related to a friction stir weld. Data from the sensor is compared to threshold values provided by an extrinsic standard setting organizations using a certification engine. The certification engine subsequently produces a report on the certification status of the weld.

22 Claims, 2 Drawing Sheets

(56) References Cited

U.S. PATENT DOCUMENTS

| | | | |
|---|---|---|---|
| 2011/0127311 A1* | 6/2011 | Peterson et al. | 228/2.1 |
| 2011/0284508 A1* | 11/2011 | Miura et al. | 219/121.64 |
| 2011/0286005 A1* | 11/2011 | Yamamoto et al. | 356/511 |
| 2012/0024433 A1* | 2/2012 | Yanar et al. | 148/535 |
| 2012/0037600 A1* | 2/2012 | Katoh et al. | 219/59.1 |
| 2012/0261457 A1 | 10/2012 | Ohashi | |

FOREIGN PATENT DOCUMENTS

| | | |
|---|---|---|
| EP | 1295670 | 3/2003 |
| EP | 2094428 | 10/2012 |
| EP | 2511038 | 10/2012 |
| JP | 2004136305 | 10/2002 |
| JP | 2003033873 | 2/2003 |
| JP | 2004317475 | 7/2003 |
| JP | 2004-050234 A * | 2/2004 |
| JP | 2004-136305 A * | 5/2004 |
| KR | 1020050047252 | 5/2005 |
| WO | 1998013167 | 4/1998 |
| WO | 200002704 | 1/2000 |
| WO | 2009146172 | 12/2009 |
| WO | 2012133411 | 10/2012 |

OTHER PUBLICATIONS

PCT/US2012/065180 filed Nov. 15, 2012 entitled "Certification of a Weld Produced by Friction Stir Welding," PCT Search Report & Written Opinion issued on May 16, 2013.

* cited by examiner

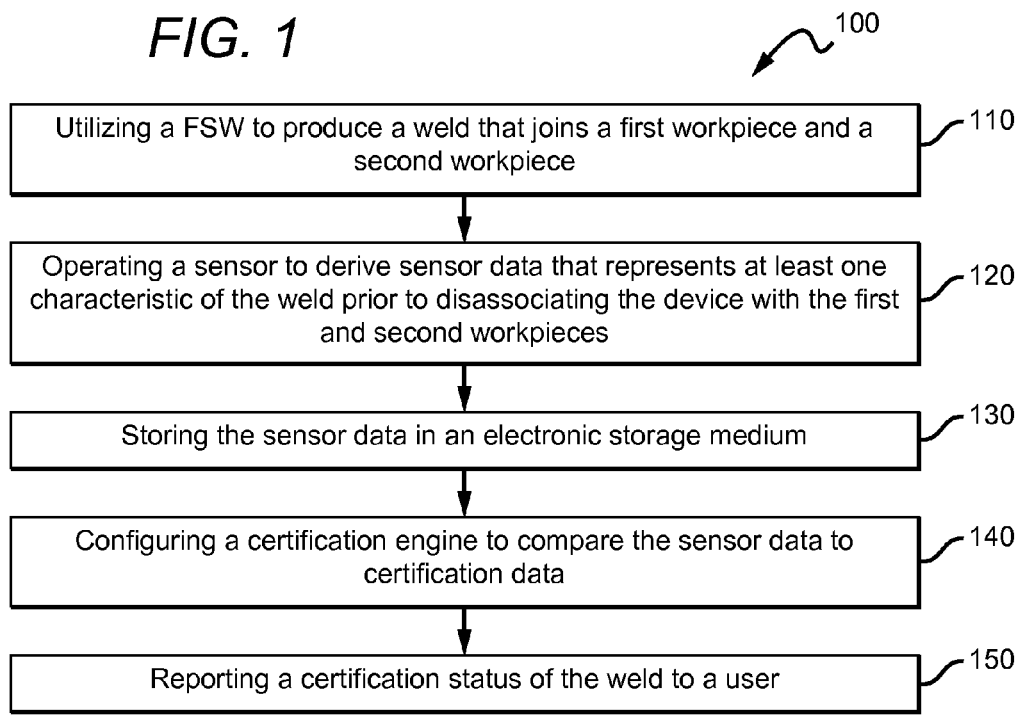

FIG. 1

110 — Utilizing a FSW to produce a weld that joins a first workpiece and a second workpiece 120 — Operating a sensor to derive sensor data that represents at least one characteristic of the weld prior to disassociating the device with the first and second workpieces 130 — Storing the sensor data in an electronic storage medium 140 — Configuring a certification engine to compare the sensor data to certification data 150 — Reporting a certification status of the weld to a user

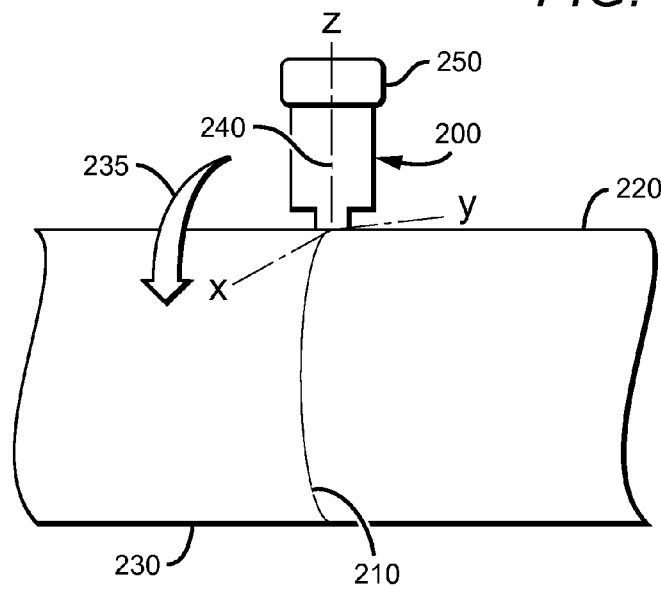

FIG. 2

FIG. 3
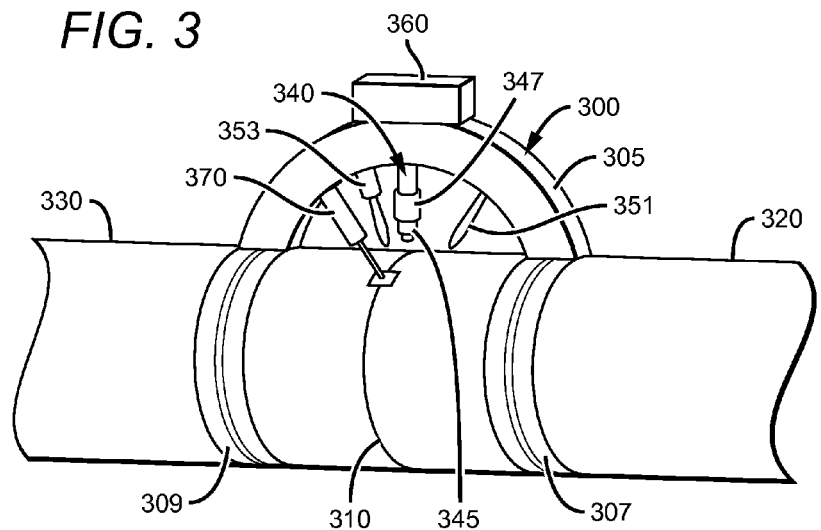
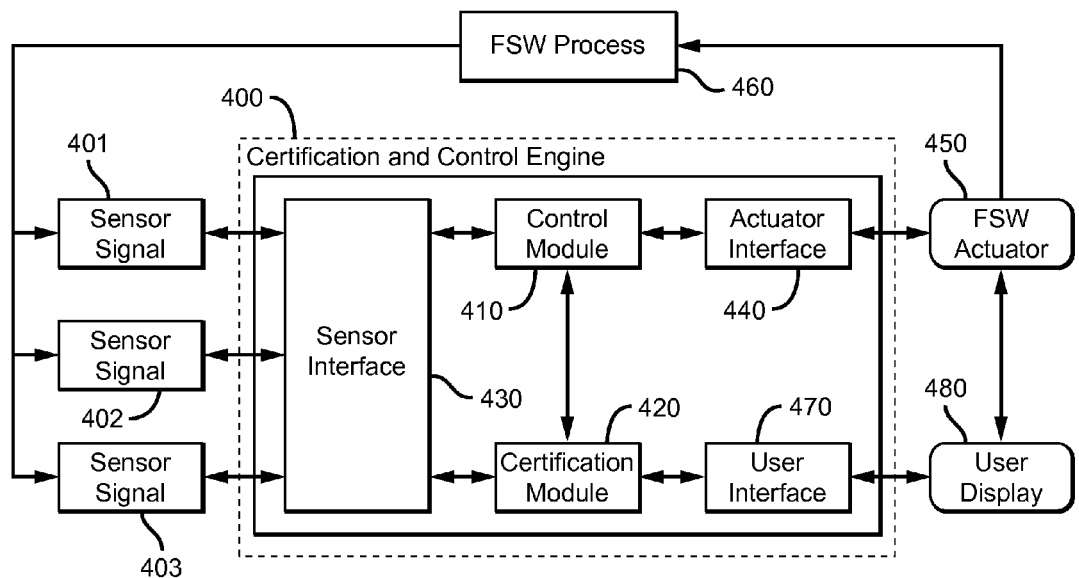
FIG. 4

CERTIFICATION OF A WELD PRODUCED BY FRICTION STIR WELDING

STATEMENT AS TO RIGHTS TO INVENTIONS MADE UNDER FEDERALLY-SPONSORED RESEARCH AND DEVELOPMENT

This invention was made with Government support under Contract DE-AC0576RLO1830 awarded by the U.S. Department of Energy. The Government has certain rights in the invention.

FIELD OF THE INVENTION

The field of the invention is friction stir welding (FSW).

BACKGROUND

The background description includes information that may be useful in understanding the present inventive subject matter. It is not an admission that any of the information provided herein is prior art or relevant to the presently claimed inventive subject matter, or that any publication specifically or implicitly referenced is prior art.

Friction stir welding ("FSW") is a solid-state welding process in which a rotating tool heats and intermixes two workpieces at a seam (e.g., a junction, joint, or boundary between the workpieces). More specifically, the rotating tool has a pin that is pressed into the seam as the tool rotates, producing frictional heat between the tool and the workpieces. Enough heat is generated such that regions of the workpieces plasticize. A shoulder of the FSW tool assists in causing the plasticized regions to intermix, thus joining (i.e., FSW) the workpieces at the seam. The rotating tool travels along the entire length of the seam to form a weld joint line between the two workpieces.

FSW provides numerous advantages over other welding processes, in part, due to the fact that FSW occurs at much lower temperatures and without a filler material. Some of the advantages of FSW include: better mechanical properties at the weld; less porosity, shrinkage, and distortion; little or no toxic fume emissions; no consumable filler material; and ease of automation. Since its conception in 1991, FSW has been heavily researched and successfully applied to numerous industries in a wide variety of applications.

The ability to produce high quality and high strength welds has made FSW an attractive process for joining large-diameter pipe sections made of high strength, such as those used in transporting petroleum. However, in order to achieve a high quality weld, many different process parameters must be monitored and controlled (e.g., travel speed rate, rotational speed rate, alignment, pressure, temperature, etc).

Numerous references describe FSW systems that have sensors for monitoring and controlling FSW process parameters in order to achieve high quality welds. U.S. Pat. No. 5,893,507 and International Patent Application Publication No. WO 00/02704, for example, describe FSW systems that monitor and/or control pressure at the FSW tool tip using pressure sensors. U.S. Pat. No. 6,050,475 describes a method of maintaining a constant pressure at the FSW tool tip by using the current of a drive motor to estimate actual pressure. U.S. Pat. No. 6,299,050 describes a FSW system that monitors and controls the distance between the FSW tool and the workpieces using a sensor just ahead of the moving FSW tool. International Patent Application Publication No. WO 98/13167 describes a FSW system that uses an ultrasonic device to measure variations in the thickness of the workpieces in order to control the distance between the FSW tool and the workpieces.

Other examples of FSW processes that monitor and control process parameters using sensors are found in European Patent Application EP2094428, U.S. Patent Application No. 2012/0261457, and International Patent Application Publication No. WO 2012/133411.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Even when FSW process parameters are carefully monitored and controlled, a certain number of defects will inescapably be present in a weld. Examples of common defects include volumetric defects (e.g., gaps or voids), root flaws or weld line defects (e.g., a portion of the seam fails to bond along the weld line), joint line remnants (i.e., when remnants of undesirable joint line materials, such as surface oxidation, mix into the weld), and excessive flash (i.e., when workpieces are overly heated and the FSW tool ejects material from the weld region). Weld deflects reduce weld quality and can even cause the weld to fail (e.g., break, crack, leak).

There are a variety of destructive and nondestructive methods for detecting such defects, including both "offline" (e.g., after the welding is completed) and "online" (e.g., while the weld is still in process or the workpieces are still associated with the FSW device) methods. Online, nondestructive methods are often preferable, as they have the potential to allow repair of the defect while the workpieces are still in place and the equipment is in operation. Online methods are especially preferred when the FSW equipment is large, heavy, and difficult to transport.

Visual inspection is one example of an online nondestructive method for detecting defects. Visual inspect can be an effective, although labor intensive, method of identifying surface flaws. Visual inspection can be automated through the use CCD cameras and appropriate image processing hardware and software.

Radiographic testing is another example of an online nondestructive method for detecting defects in welds and can even be used to identify "hidden" defects (i.e., defects not readily observable with the natural eye). Radiographic testing operates by exposing the weld to a radiation source (e.g., emission from gamma radiation sources such as 192Ir, 60Co, and 137Cs) and measuring the amount of radiation that penetrates the workpiece. Radiographic testing provides information on the thickness and composition of the weld.

Another method for online nondestructive testing is ultrasonic characterization. This method provides information on the density distribution of materials and is well suited for detecting voids and root flaws. U.S. Patent Application Publication No. 2003/0057258, for example, discloses a FSW machine that includes an ultrasonic probe that trails the path of the FSW tool to identify and mark defects. U.S. Patent Application Publication No. 2009/0140026A1 and Japanese Patent Application Publication No. JP2004317475 also disclose the use of ultrasonic probes to characterize defects in FSW welds.

Yet another example of an online nondestructive testing method is eddy current detection, which yields information regarding the density and composition of material within the weld. Unfortunately, eddy current detection does not penetrate workpieces well and thus is limited to relatively thin workpieces. Examples of FSW systems that include eddy current detection of defects are found in U.S. Patent Application Nos. 2010/0117636A1, 2004/239317, and U.S. Pat. No. 6,168,066.

Other methods of detecting defects in welds involve inferring the presence of a defect based on correlative data. For example, "Monitoring and Control in Friction Stir Welding" by Paul A. Fleming (dissertation submitted to the Faculty of Graduate School of Vanderbilt University, May, 2009) describes utilizing acoustic and electromagnetic emissions generated by the FSW tool during the welding process to infer the presence of defects in a weld. Similarly, attempts have been made to train neural networks to associate force and torque data gathered during FSW with the presence of weld defects. While these attempts have shown some success, those of ordinary skill in the art have failed to produce adequate quantitative information about the presence and severity of specific defects to provide an online certification method.

As used herein, "online certification" as it applies to FSW, means to provide a certification of a FSW weldment while the FSW device is still associated with the workpieces that are being joined. As used herein, "associated" means that the FSW device is still attached to, in physical contact with, or at least within close proximity to (e.g., in the same room, building, or worksite), the workpieces. The terms "dissociation," "dissociated," "disassociate" and the like are used herein to refer to a FSW device that is no longer associated with the workpieces and/or weld site (e.g., the FSW device has been detached from and/or removed from the worksite).

While various methods of detecting weld defects and flaws are known, these methods fail to provide an online nondestructive method for automatically or semi-automatically certifying that a weld complies with the standards of standard setting organization. Examples of standard setting organizations include the International Organization for Standardization (ISO), the American Welding Society (AWS), and the American Society of Mechanical Engineers (ASME). Since the certification of weld quality is critical in certain applications, it would be advantageous to determine whether a weld passes certification while workpieces and FSW devices are still associated with one another, thereby facilitating efficient repair of the flawed piece.

Thus, there remains a need for a system and method that provides online certification of friction stir welds.

SUMMARY OF THE INVENTION

The inventive subject matter provides apparatus, systems, and methods of acquiring certification-related information related to a weld. In one aspect of some embodiments, the method comprises utilizing a FSW device to produce a weld that joins two or more workpieces, and operating a sensor to gather data related to one or more properties of the weld. In some embodiments, the step of operating a sensor to gather data is performed while the FSW device is still attached to, or in physical contact with, the workpieces. In other embodiments, the step of operating a sensor to gather data is performed after the FSW device has been removed from the workpieces, but still within close proximity to the workpieces (e.g., in the same room, building, or worksite).

Contemplated methods may also include the steps of storing the sensor data in an electronic storage medium and comparing the data to a set of certification data. The certification data represent a set of threshold weld characteristics that are defined by an extrinsic standard setting organization (e.g., ISO, AWS, ASME, etc). In some embodiments, the threshold characteristics correspond to a FSW standard. For example, the threshold characteristics may correspond to ISO code no. 25239-5:2011. Alternatively, the threshold characteristic may correspond to an AWS D17.3/D17.3M:2010. In some embodiments, the threshold characteristics may correspond to two or more sets of FSW standards.

The step of comparing the sensor data to the certification data is preferably performed automatically and electronically using a certification engine and while the FSW device is still associated with the workpieces.

In yet other aspects, contemplated methods include the step of reporting a certification status of the weld to a user. For example, a report may be generated for the user that compares a sensed characteristic of the weld to the corresponding threshold characteristic. In some embodiments, the certification status is reported prior to separation of the workpieces from the FSW device. In other embodiments, the certification status is reported while the FSW device is still within about 10 meters of the weld.

Examples of sensor data include, but are not limited to, data related to a conductivity, density, permittivity, magnetic permeability, radiolucency, and/or optical characteristics (e.g., reflectivity, color) of the weld. Other examples of sensor data include temperature data of the weldment and workpieces, temperature data of the FSW tool, and load data (e.g., force data) of the FSW tool in the x, y, and z directions.

In other aspects of some embodiments, sensor data can be gathered from either one sensor, or a plurality of sensors. Alternatively, a single sensor that utilizes multiple sensory modes may be used.

The inventive subject matter also provides a FSW device that includes a first arm that is coupled with a FSW tool and a second arm that is coupled with a sensor that produces a signal which includes sensor data. The FSW device further includes a control system that controls movement of the first arm and second arm and a certification engine that receives the sensor signal and compares the sensor data to certification data. The FSW device can also include a reporting engine and reporting device coupled with the certification engine and configured to report certification status of the weld to a user. In such embodiments certification data may represent one or more threshold weld characteristics defined by an extrinsic standard setting organization.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 1 shows a schematic of a method of acquiring certification-related information related to a weld.

FIG. 2 shows a friction stir welding tool for joining two pipe segments.

FIG. 3 shows a friction stir welding device that has sensors and a certification engine.

FIG. 4 shows a schematic of a certification engine for acquiring certification-related information and reporting a certification status.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

It should be noted that while the following description is drawn to certification systems for FSW devices and processes, various alternative configurations are also deemed suitable and may employ various computing devices including servers, interfaces, systems, databases, agents, peers, engines, controllers, or other types of computing devices operating individually or collectively. Such computing devices may be integrated into a FSW device, or may be nonintegrated devices that are located proximate to the FSW device. Alternatively, various computing components can be located at a remote site. One should appreciate that computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In some embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should also appreciate that the disclosed techniques provide many advantageous technical effects including online nondestructive weld certification methods and systems. More specifically, the inventive subject matter provides apparatus, systems, and methods by which one can generate an online certification of a friction stir weld. Such certification provides the user with documentation that a weld meets acceptance standards and insures the quality of the welded workpieces. Alternatively, failure to meet such standards can serve to alert a user to flaws in the weld, which may then be repaired while workpieces are still in place on the FSW device, thus avoiding costly relocation, remounting, and/or realignment of the workpieces with the FSW device.

FIG. 1 illustrates a method 100 of acquiring weld information for certifying a weld. Method 100 begins with step 110, in which the workpieces to be welded by a FSW process are aligned with a FSW device. In step 110, the FSW process is initiated by placing a rotating FSW tool tip at the seam (e.g., joint, junction, boundary, weld site, etc.) of the workpieces and applying pressure so that the a pin of the FSW tool tip penetrates the seam. Once the proper pressure, depth, revolutions per minute (RPM), and attack angle of the FSW tool has been achieved, the FSW tool tip is moved along the path of the desired weld, softening and mixing the material of the workpieces to form a weld (also referred to as a FSW weldment).

The workpieces to be welded can be flat pieces, pipe segments, or even irregular-shaped pieces. The material of the workpiece can be aluminum, aluminum alloy, stainless steel, high strength steel alloys, or any other metal, non-metal, and/or composite compositions suitable for use with a FSW process. The inventive subject matter is not intended to be limited to any particular workpiece configuration (e.g., size, shape, composition, etc.). Likewise, the inventive subject matter is not limited to any particular seam configuration. In some embodiments, the seam is a butt joint or a lap joint.

Step 120 involves operating one or more sensors to obtain information about the weld for the purposes of characterizing the weld quality (e.g., identifying defects), providing a certification status, and/or controlling the FSW process parameters. In some embodiments, step 120 is performed while the workpieces are still engaged with the FSW device (e.g., the workpieces are still physically attached to, or in contact with, a component of the FSW device such as an anvil, platform, or platform clamps). The one or more sensors may begin to acquire signals before, during, or even after the FSW process to obtain information relevant to characterizing the weld. In some embodiments, the sensor(s) start to acquire data before the FSW tool has penetrated the workpieces and continues to acquire data until the FSW tool tip is removed from the workpieces and the workpieces have reached room temperature.

Contemplated sensors can include any sensor suitable for gathering data related to characterizing a weld and/or controlling process parameters. In some embodiments, the sensor comprises an optical sensor configured to detect optical characteristics of a weld. Such optical sensors may be used in conjunction with image recognition software and hardware that permits characterization of an optical image. Such characterization may provide information related to composition, for example, the presence of oxidized material. The characterization of optical sensor data may also provide information related to the dimensions of a weld, gaps or discontinuities in the weld, and/or the presence of flash material.

In other embodiments, the sensor can comprise a radiation sensor, configured to work in concert with a radiation source for radiographic detection. Suitable radiation sources include, but are not limited to X ray sources and radioactive isotopes. Such radiation sensors provide data related to radiation intensity from such a radiation source when the weld is interposed between them. Such data may provide information related to radiolucency of material of a weld, gaps or voids within a weld, thickness of a weld, and/or composition of a weld.

In yet other embodiments, the sensor can comprise an ultrasonic sensor. The ultrasonic sensor can include an emitter and a detector, which may be used in concert to gather data regarding a weld. Such data includes, but is not limited to, information related to the presence of gaps and/or voids within a weld, depth of a weld, density of the material of a weld, and discontinuities in a weld.

Still another embodiment of the inventive method may use an eddy current sensor configured to characterize a weld. Such eddy current sensors may utilize a magnetic field to induce an electric field in the material of a weld, thereby gathering data regarding a weld. Such data includes, but is not limited to, the presence of gaps or voids within a weld, depth of a weld, density of material of a weld discontinuities in a weld, composition of material of a weld, conductivity of material of a weld, and permittivity of material of a weld. Such an eddy current sensor may be an array of eddy current sensors.

In some embodiments, the sensor can comprise one or more force transducers (e.g., load cells) that measure and record the forces (e.g., load data) experienced by the FSW tool. The sensor(s) can be configured to measure forces in all three directions within a three-dimensional space: the x-direction (i.e., the direction of travel of the FSW tool), the y-direction (i.e., the direction perpendicular to the direction of travel and within the plane of the workpiece surface), and the z-direction (i.e., the direction perpendicular to the plane of the workpiece surface). For non-planar workpiece surfaces, the "plane" of the workpiece surface is a hypothetical plane that is substantially tangential to the workpiece surface. The three directions of force are illustrated in FIG. 2.

FIG. 2 shows a perspective view of a FSW tool 200, which is about to engage seam 210. Seam 210 is the junction at which two non-planar workpieces, namely, pipe segment 220 and 230, meet. During the FSW process, FSW tool 200 will travel in an orbital fashion along seam 210 in direction 235 (parallel to the x-direction) to form a weld. As FSW tool 200 travels, force transducer 250 gathers load data that represent the forces experienced by FSW tool 200 in the three directions illustrated by axes 240, namely, the x-direction, y-direction, and z-direction. The load data can be used, either independently or in combination with other data, to characterize the weld, provide a certification status, and/or control the FSW process parameters.

Those of skill in the art will appreciate that step 120 of method 100 can comprise operating a single sensor to acquire information about a weld and could also comprise operating two or more sensors to acquire information about a weld. In some embodiments step 120 comprises operating a single sensor that utilizes two or more sensing modes.

To facilitate the gathering of sensor data prior to disassociation of the workpieces and the FSW device, some embodiments may utilize a particular temporal relationship between activity of a FSW tool and gathering of data related to a weld characteristic by a sensor. For example, a sensor may be configured such that it maintains a fixed distance from a FSW tool. In such an embodiment a sensor may gather data characterizing a weld at less than about 1, 2, 3, 4, 5, 10, 15, 20, 25, 30, 45, or 60 minutes from the production of a weld or seam.

In other embodiments, the time at which data is gathered may be related to the temperature of the weld, seam, surrounding workpiece, or FSW tool. This temperature may correspond to the upper tertile of a functional temperature range of a sensor mode or technology. In such an embodiment a sensor may gather data characterizing a weld after it reaches a temperature of less than about 25° C., 35° C., 50° C., 75° C., 100° C., 200° C., 350° C., or 500° C.

In yet other embodiments, the sensor(s) may maintain a particular spatial arrangement with a FSW device (or a portion thereof). In such embodiments, the sensor may follow behind the FSW tool tip at a fixed distance. Alternatively, a sensor may follow behind FSW tool tip at a distance of less than about 1 cm, 2 cm, 5 cm, 10 cm 25 cm, 50 cm, 75 cm, 1 meter, 2 meters, 3 meters, 4 meters, or 5 meters. In addition, the sensor may be configured to acquire weld data when the FSW tool tip is less than about 1, 2, 3, 4, 5, 7.5, or 10 meters from the weld or seam. In other embodiments the sensor may maintain an angle relative to the path of the FSW tool tip. In such embodiments the sensor may trail the path of the tool tip at an angle of 0.5 radians, 1 radian, 2 radians, 3 radians, or 4 radians.

In other aspects of some embodiments, the sensor(s) may be coupled to an arm of the FSW device. In some embodiments, an arm holding the FSW tool also holds at least one sensor. In other embodiments, the sensors are held by separate arms than the FSW tool.

In step 130 of method 100, data obtained from the sensor(s) may be stored on any suitable electronic storage medium. Suitable electronic storage media include, but are not limited to, magnetic media (such as, for example, a hard drive), SRAM, DRAM, EEPROM, ECC memory, and/or flash memory. The electronic storage medium may be located proximate to the weld or may be located at a remote site. In some embodiments, data obtained from a sensor is transmitted to more than one memory location, for example to a computing device integrated into a FSW device and to a remote database or server utilized by an offsite plant or project modeling system.

In step 140, data obtained from the sensor(s) is utilized by a certification engine. The certification engine can be configured to perform an operation or algorithm that relates sensor data to one or more certification data that represent, or relate to, certification requirements and/or standards. One example of certification data may include threshold values related to the presence, dimensions, location, and/or number of defects in a weld. In some embodiments, the certification data is determined by the user (e.g., the welder) or entity in direct or indirect control of the FSW process (e.g., general contractor or Engineering/Procurement/Construction firm). In a preferred embodiment of the inventive subject matter, the certification data are obtained from an extrinsic standard setting organization. As used herein, "extrinsic" entities are entities not under the control of the user of the inventive method and/or the FSW device. Examples of extrinsic standard setting organizations include, but are not limited to, the American Welding Society, the International Standards Organization, and the National Aeronautics and Space Administration. Certification data can be obtained from weld standards such as ISO 25239-1:2011 through ISO 25239-5:2011 and AWS D17.3/D17.3M:2010.

In some embodiments, the certification data could represent two or more distinct standards set by different organizations. In such embodiments, the certification engine compares the sensor data with the two or more distinct standards to determine whether each standard has been satisfied.

In other aspects, step 140 may additionally include the step of configuring the certification engine to process sensor data to produce derived data. The derived data can then be compared with certification data, either in addition to, or instead of the sensor data (e.g., raw data), to determine a certification status. For example, when the sensor data comprises load data (from a force transducer) and temperature data (from a temperature sensor), the certification engine can be configured to correlate the load data and temperature data to provide a new set of derived data. The derived data can then be used to characterize the weld and determine a certification status.

As another example, the step of producing derived data could include performing a fast Fourier transform operation on the temperature data and/or x-direction load data and y-direction load data in a manner that characterizes the weld. In addition to performing a Fourier transform, the certification engine can be configured to compare the signal phases of the x-direction load data and y-direction load data to produce derived data. The derived data can then be used to provide a characterization of the weld. It is also contemplated that the step of producing derived data could include numerous iterations of correlations and derivations using algorithms that account for many FSW process parameters and sensor data (e.g., load cell voltage, amperage, tool travel speed, tool RPM, optical data, temperature profiles, etc.).

Step 150 comprises reporting a certification status of a weld. In some embodiments, the certification status is reported prior to separating the welded workpieces from the FSW device. As noted above, this provides the user with the opportunity to repair a flawed weld (should a weld fail to pass certification) without the need to remount and realign the workpieces and FSW device. A report of certification status may be provided directly to a user of the FSW device. Alternatively, a report of certification status may be transmitted to a database of a plant or project modeling system. In some embodiments, a report of certification may be provided to multiple sites and/or users. Suitable reporting devices include, but are not limited to, a monitor or display, and/or a printer. Alternatively, a reporting device may transmit an electronic certification status report in the form of an email, text message, and/or database entry.

Method 100 could additionally include the step of configuring a control engine or control module to analyze the sensor data and provide a control signal to an actuator of the FSW process. For example, the control signal could cause an actuator to change the travel speed, RPM, depth, or z-direction force of the FSW tool. The signal could also cause an actuator to change the temperature of a heating/cooling element in contact with the workpieces.

The control engine is preferably configured to provide a control signal that improves at least one characteristic of the weld. For example, the control engine could be configured to analyze many process parameters in a manner that anticipates the formation of a defect and/or the formation of a particular molecular structure (e.g., austenite, martensite, pearlite, large grain sizes, small grain sizes, etc.). Based on the inferences derived from the sensor data, a control signal can adjust process parameters to avoid defects while still achieving the desired molecular structure.

FIG. 3 shows a FSW device 300 and a seam 310. Seam 310 represents the joint between two workpieces, namely, pipe segment 320 and pipe segment 330. Device 300 comprises a frame 305 movably coupled with clamp 307 and clamp 309. Clamp 307 is used to clamp FSW device 300 to pipe segment 320, while clamp 309 is used to clamp FSW device 300 to pipe segment 330.

Frame 305 has an arm 340 that holds a FSW tool 345. Tool 345 includes a shoulder portion and a pin portion. During the FSW process, arm 340 hydraulically extends toward seam 310 while rotating FSW tool 345 such that the shoulder portion is pressed against the surface of seam 310 while the pin portion penetrates into seam 310. Frame 305 then travels orbitally around seam 310 via tracks on clamps 307 and 309. The frictional heat produced by the rotation and travel of FSW tool 345 is sufficient to melt and mix the workpieces at seam 310, thus producing a solid sate weldment along seam 310.

Arm 340 also includes a force transducer 347, which measures load data in the x, y, and z directions (see FIG. 2) experienced by FSW tool 345.

Frame 305 also has a first sensor 351 and a second sensor 353. Sensor 351 and sensor 353 collect data relevant to characterizing a weld and/or controlling FSW process parameters. Sensor 351 and sensor 353 can comprise any sensor suitable for characterizing a weld. Examples of sensors include, but are not limited to, optical sensors, radiation sensors, ultrasonic sensors, eddy current sensors, or any sensor modality appropriate for characterizing the composition and nature of the weld. Sensor 351 and sensor 353 gather data before, during, and after the active welding step (i.e., the period during which FSW tool 345 rotates, penetrates, and travels along seam 310).

Sensor 351 and sensor 353 produce data signals that are transmitted to computing system 360. Computing system 360 includes an electronic storage medium, processor, executable code, and other electrical and non-electrical components necessary for storing and analyzing electronic data. Computing system 360 also includes a certification engine and a control engine. The certification engine is configured to store sensor data provided by the signals from sensor 351 and sensor 353 in the electronic storage medium. The certification engine is also configured to compare sensor data with certification data to determine a certification status of the weld. In some embodiments, the certification engine is additionally configured to analyze sensor data and process parameter data to produce a set of derived data that is useful for characterizing a weld.

The control engine is configured to monitor and record the FSW process parameters. The control engine is also configured to produce at least one control signal that is transmitted to at least one actuator (e.g., hydraulic systems, servo-motors, etc.). The control signal adjusts process parameters during the FSW process to improve weld quality and process performance (e.g., efficiency, cost, etc.).

FSW device 300 also has a heating/cooling element 370 that can regulate the temperature of seam 310 before, during, and/or after welding.

Those of ordinary skill in the art will appreciate that numerous variations and alternative configurations for FSW device 300 are possible without departing from the inventive concepts described herein. For example, FSW device 300 could include only one sensor, or three or more sensors. Some sensors may be in contact with the workpiece surface while others may be noncontact sensors. In other aspects, some sensors may be supported by a common arm rather than distributed on two or more different arms. Some sensors may even be statically placed on the workpieces and remain stationary while frame 305 rotates orbitally around seam 310.

Sensor signals could be transmitted to computing system 360 via a wired connection, such as an Ethernet cable, a USB cable, a serial data cable, and/or a parallel data cable. Alternatively, signals may be transmitted wirelessly via, for example, Bluetooth and or WiFi transmission protocols.

In yet other embodiments, computing system 360 may be located apart from frame 305. For example, computing system 360 could be a desktop computer located at the worksite but physically decoupled from frame 305. In such embodiments, computing system 360 is still communicatively coupled with the sensors and actuators of FSW device 360, either via a wired or wireless communication channel.

Computing system 360 may include a display (e.g., monitor screen) to provide certification status reports to a user. Computing system 360 may also include any number of input/output devices for user interaction (e.g., keyboard, mouse, touch screen display, microphone and voice recognition, printers, email capabilities, etc.). In some embodiments, computing system 360 may be coupled with an information network, such as, for example, the internet and/or a company intranet.

While computing system 360 is shown as a single component, computing system 360 could also comprise a plurality of individual computing devices (e.g., distributed storage/processing, virtual storage/processing, etc.). The executable code that represents the certification engine and control engine could be stored together in one device and in one electronic file, or across multiple devices and files.

FIG. 4 shows a schematic of a certification and control engine 400. Engine 400 has a control module 410 and a certification module 420. Engine 400 receives sensor signals from a plurality of sensors 401, 402, and 403 via sensor interface 430. Interface 430 provides sensor signal data to modules 410 and 420 for analysis. Control module 410 analyzes sensor signal data to determine whether adjustments should be made to FSW process 460. If adjustments need to be made, control module 410 transmits a control signal to FSW actuator 450 via actuator interface 440. Actuator 450 makes an adjustment to FSW process 460. Sensors 401, 402, and 403 produce new sensor signals based on the adjustments to 460. The new sensor signals are transmitted to sensor interface 430 and the previous steps are repeated.

Sensor signals are also transmitted to certification module 420. Module 420 compares the sensor signals to certification data to determine whether FSW process 460 has produced a weld that passes certification standards. In some embodiments the certification data is provided by an extrinsic standard setting organization. Certification module 420 provides a certification status report to user display 480 via user interface 470. In some embodiments the certification status report is transmitted to user display 480 while the FSW device of FSW process 460 is still associated with the workpieces.

Engine 400 is in communication with a database (not shown). Engine 400 stores sensor signal data on the database as sensor data objects. Engine 400 also stores other data objects on the database that represent certification status reports, data derived from sensor data, and process parameter data. The database also includes certification data objects that represent certification standards. Engine 400 compares sensor data objects with certification data objects to provide a certification status report.

Different applications of certification and control engine 400 are illustrated below by way of non-limiting examples.

Example 1

Two flat workpieces can be mounted in a FSW device and aligned to form a butt joint. The FSW device can be programmed to form a 15 meter long weld at the joint between the work surfaces. The FSW tool can be moved along the seam and trailed by a CCD-based optical sensor by a distance of 15 cm. Image characterization software can be utilized to identify areas of reduced reflectivity and calculate their dimensions and orientation. This data can be transmitted to a certification engine, which includes a database containing ISO certification standards for FSW welds. The standard could include the requirement that no more than 3 weld line defects occur along the length of the weld and that they occupy no more than 0.2% of the total length of the weld. The certification engine interprets sensor data by applying algorithms that correlate sensor data with weld defects in order to derive weld defect data. The certification engine then compares the sensor data and/or weld defect data derived from sensor data to the ISO standards.

A report can be generated by the certification engine indicating that the weld is either passes or fails the certification standards. The report may also indicate the positions and dimensions of the weld line defects while the welded workpieces are still engaged with the FSW device. This allows the operator of the FSW device to repeat portions of the welding operation in order to repair these defects without re-mounting.

Example 2

A FSW device can be used to join two segments of steel pipe with an internal diameter of 2 meters. The pipe segments may be aligned and a FSW device programmed to move along the external diameter of the joint in order to form a weld at the joint between the work surfaces. As the FSW tool moves along the seam it may be trailed by an ultrasonic sensor by a distance of 1 meter. The ultrasonic sensor can include an emitter and a receiver. Echoes from the emitted ultrasound can be used to characterize the dimensions of the weld and enumerate/estimate the dimensions of volumetric defects within the weld by methods known in the art. This data can be transmitted to a certification engine, which includes a database containing AWS standards for friction stir welds. These standards can include a requirement that the accumulated volume of volumetric defects does not exceed 0.05% of the total volume of the welded. A report can be generated by the certification engine indicating if the weld is certified. The certification engine can be configured to (i) print the report for the FSW operator and (ii) transmit the report to a project database associated with a project model system.

Example 3

A FSW device can be used to join planar workpieces. During the FSW process, a sensor gathers load data that represents the forces experienced by the FSW tool in the x, y, and z directions. The FSW device also includes a plurality of temperature sensor that measure the temperature of the workpieces just head of the FSW tool, behind the FSW tool, and the area surrounding the seam. The load data and temperature data are transmitted to a certification and control engine. The engine monitors and processes the sensor data and other process parameters (e.g., FSW tool's rpm and travel speed) and runs an algorithm(s) that is configured to anticipate the formation (or probability of formation) of a weld defect and/or determine the presence of a weld defect.

The algorithm(s) utilizes a known correlative relationship between a temperature profile (e.g., temperature of an area over time, rates of temperature changes, etc.) and weld characteristics (e.g., presence of defects, molecular phase of an alloy, etc.) to anticipate a weld defect formation or to determine the presence of a weld defect. The algorithm(s) also utilizes a known correlative relationship between load data and weld characteristics. For example, the algorithm(s) could apply a fast Fourier transform to the x and y forces. Alternatively, the algorithm(s) could compare the phases of the x and y forces, thus avoiding the heavy processing requirements of Fourier transform operations.

When the certification and control engine anticipates the formation of a weld defect, the engine sends a signal to various actuators that control and adjust process parameters (e.g., z force, depth of FSW tool, travel speed of FSW tool, RPM's of FSW tool, etc.). The certification and control engine also provides real-time certification reporting that notifies a user when the weld fails a certification standard. The user can then decide whether to terminate the FSW process early or allow the FSW device to continue running.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of acquiring certification-related information related to a weld, comprising:
   utilizing a friction stir welding device to produce a weld that joins a first workpiece and a second workpiece;
   operating a sensor to derive sensor data that represents at least one characteristic of the weld prior to disassociating the device with the first and second workpieces;
   storing the sensor data in an electronic storage medium;
   configuring a certification engine to compare the sensor data to certification data, wherein the certification data represent at least one threshold weld characteristic defined by an extrinsic standard setting organization; and
   reporting a certification status of the weld to a user.

2. The method of claim 1, further comprising generating a report relating the sensed characteristic to the threshold characteristic.

3. The method of claim 1, wherein the threshold characteristic is a friction stir welding standard.

4. The method of claim 3, wherein the threshold characteristics are derived from a ISO 25239-5:2011 code.

5. The method of claim 3, wherein the threshold characteristics correspond to an AWS D17.3/D17.3M:2010 code.

6. The method of claim 1, wherein there is a time lag of less than about 60 minutes between producing the weld and operating the sensor.

7. The method of claim 6, wherein the time lag is less than about 10 minutes.

8. The method of claim 6, wherein the time lag is less than about 1 minute.

9. The method of claim 1 wherein the step of operating the sensor occurs prior to a maximum temperature of the weld falling below about 100° C.

10. The method of claim 1, further comprising using a rotating friction stir welding tool to produce the weld and using the sensor to provide a signal from which at least one of the sensor data is derived.

11. The method of claim 10, further comprising having the sensor trail the friction stir welding tool by no more than 1 meter during the step of operating the sensor.

12. The method of claim 10, further comprising having the sensor trail the friction stir welding tool by no more than 4 radian during the step of operating the sensor.

13. The method of claim 10, further comprising having the sensor trail the friction stir welding tool by a fixed distance during the step of operating the sensor.

14. The method of claim 10, wherein the sensor data comprises load data of the friction stir welding tool.

15. The method of claim 10, wherein the sensor data comprises temperature data of the friction stir welding tool and temperature data of the weld.

16. The method of claim 1, further comprising coupling the sensor to an arm of the friction stir welding device.

17. The method of claim 1, wherein a portion of the step of operating the sensor occurs when the rotating pin is less than about 10 meters from the weld.

18. The method of claim 1, wherein the at least one characteristic of the weld is selected from the group consisting of conductivity, density, permittivity, magnetic permeability, optical characteristic, radiolucency, temperature, and temperature profile.

19. The method of claim 1, further comprising at least partially positioning the sensor inside the weld.

20. A method of issuing a certification with respect to the weld of claim 1, comprising issuing the certification prior to separating the friction stir welding device from the first and second workpieces.

21. A method of issuing a certification with respect to the weld of claim 1, comprising issuing the certification prior to moving the friction stir welding device more than about 10 meters from the weld.

22. A friction stir welding device for producing a weld to join a first workpiece and a second workpiece, comprising:
   a first arm that couples with a friction stir welding tool;
   a second arm that couples with a sensor, wherein the sensor produces a signal comprising sensor data;
   a control system that controls movement of the first arm and second arm;
   a certification engine that receives the signal and compares the sensor data to a certification data, wherein the certification data represent at least one threshold weld characteristic defined by an extrinsic standard setting organization; and
   a reporting device coupled with the certification engine and configured to report a certification status of the weld to a user.

* * * * *